US006419972B1

(12) United States Patent
Akimoto et al.

(10) Patent No.: US 6,419,972 B1
(45) Date of Patent: Jul. 16, 2002

(54) STARCH-BASE PUFFED SNACK FOODS AND PROCESS FOR PRODUCING THE SAME

(75) Inventors: Shuji Akimoto; Hajime Hamada; Iwao Hachiya, all of Saitama (JP)

(73) Assignee: Meiji Seika Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/623,508

(22) PCT Filed: Apr. 7, 1999

(86) PCT No.: PCT/JP99/01850

§ 371 (c)(1), (2), (4) Date: Sep. 29, 2000

(87) PCT Pub. No.: WO99/53774

PCT Pub. Date: Oct. 28, 1999

(30) Foreign Application Priority Data

Apr. 17, 1998 (JP) ............................................ 10-107350

(51) Int. Cl.$^7$ .................................................. A23L 1/18
(52) U.S. Cl. ....................... 426/559; 426/144; 426/440; 426/445; 426/516; 426/808
(58) Field of Search ................................. 426/440, 559, 426/445, 808, 516, 144; 425/461

(56) References Cited

U.S. PATENT DOCUMENTS

| | | | | | |
|---|---|---|---|---|---|
| 3,462,276 | A | * | 8/1969 | Benson | 426/440 |
| 4,879,126 | A | * | 11/1989 | Willard et al. | 426/440 |
| 5,132,127 | A | * | 7/1992 | Wisdom | 426/440 |
| 5,149,555 | A | * | 9/1992 | Findall | 426/448 |
| 5,464,642 | A | * | 11/1995 | Villagran et al. | 426/439 |
| 5,514,387 | A | * | 5/1996 | Zimmerman et al. | 426/74 |
| 6,054,166 | A | * | 4/2000 | Dupart | 426/440 |

* cited by examiner

Primary Examiner—Lien Tran
(74) Attorney, Agent, or Firm—Rader, Fishman & Grauer

(57) ABSTRACT

There are provided a stick type expanded starch confectionery with a wave-like configuration on its surface and a process for easily manufacturing the same, which uses an extruder method. According to the process, the stick type expanded starch confectionery is obtained by adjusting amounts of water and calcium salt to an amount of starch raw material to prepare a dough, whereby fluidity of thermally treated dough extruded from a double-staged die which belongs to an extruder is controlled.

6 Claims, 4 Drawing Sheets

STARCH-BASE PUFFED SNACK FOODS AND PROCESS FOR PRODUCING THE SAME

TECHNICAL FIELD

The invention relates to an expanded starch confectionery, and more particularly a stick type expanded starch confectionery with a wave-like stereo-configuration on its surface and a process for the manufacture of same.

BACKGROUND ART

For manufacturing an expanded starch confectioneries, hitherto, there are a pellet method, wherein a starch raw material is cooked by water steam, kneaded, rolled into a sheet, punched into pieces, dried to obtain pellets, and then roasted or deep-fried to cause expansion thereof, and an extruder method, wherein the starch raw material is fed to an food processing extruder to thermally treat the same, extruded from a die of the extruder to cause expansion thereof, and cut the same.

In case of manufacturing an expanded starch confectionery with a stereo-configuration on its surface, a dough sheet with a certain pattern on its surface can be obtained by the pellet method by using a roll(s) having such a pattern thereon, but pelletizing thereof has been carried out by punching operation and curvature or arcuation shall apt to be occurred during expanding operation, and thus it is quite difficult or impossible to manufacture stick type expanded products, by the pellet method.

According to the extruder method, the starch raw material thermally treated under pressure in the extruder is extruded from a die thereof to cause expansion thereof and thus a stick type expanded product can be obtained, but for giving an intended stereo-pattern to surface thereof, an additional pattern forming step is required to make troublesome the process and increase production cost.

Therefore, it may be fairly be said that a stick type expanded starch confectionery with an intentional and more particularly, a regular stereo-pattern on surface thereof has not been manufactured.

DISCLOSURE OF INVENTION

Therefore, an object of the invention is to dissolve said problems in the prior arts, and to provide a stick type expanded starch confectionery with a wave-like stereo-configuration on its surface by the extruder method and a process for the manufacture thereof.

The inventors have energetically studied and investigated for dissolving the problems in the prior arts to finally find that a stick type expanded starch confectionery with the wave-like configuration on its surface can be manufactured by controlling fluidity of a starch dough thermally treated under pressure and to be extruded from a die belonging to an extruder with amounts of water and calcium salt for preparing the dough, and selecting the die having a double stage structure, whereby rotational motion of the dough given by a screw of the extruder is maintained or amplified also near outlet of the die, although such a motion shall be remarkably damped in a conventional food processing extruder.

Therefore, a process for the manufacture of the stick type starch confectionery with a wave-like configuration on surface thereof, according to the invention comprises steps of adding water to cereals or a mixture of the cereals and pulses to mix and homogenize the same, leaving the homogenized mass as it is, for a time, adding a calcium salt and mixing the same to prepare a dough, feeding the dough into an extruder to thermally treat the same, and extruding the cooked dough through a double-staged die which has an outlet-side inner diameter larger than inlet-side one, a gradually enlarging inner diameter in a transitional portion from an ending part of the inlet-side to a beginning part of the outlet-side in linearly or curved line, toward the outlet-side, and a circular cross-section.

In the double-staged die, it is preferable that the inner diameter at inlet-side for the dough is not exceeding 10 mm and that the inner diameter at outlet-side is 2–30 mm and about twice of the inner diameter at inlet-side. A feeding rate of the dough charging into the extruder depends on dough extruding ability of the extruder due to rotational speed of a screw arranged therein.

The stick type expanded starch confectionery according to the invention is that obtained by-such a process and characterized in that a calcium salt contains 0.5–5 parts by weight to 100 parts by weight of cereals or a mixture of the cereals and pulses, as the starch raw materials.

As the cereals, corn grits, wheat flour and rice flour can be exemplified, and soy bean flour, green gram flour and red bean flour can be exemplified, as the pulses. As the calcium salt, egg shell calcium, calcium carbonate and calcium sulfate can be exemplified.

The process according to the invention will now be explained in more detail. In the first place, water of 1–14 parts by weight and more preferably 5–11 parts by weight is added to 100 parts by weight of the starch raw material of cereals or a mixture of cereals and pulses to mix and homogenize the same and to leave it as it is, for a time of 20–60 minutes, so that moisture sufficiently permeates into the starch raw material. Then, a calcium salt, for instance, egg shell calcium of 0.5–5 parts by weight and more preferably 1.4–2.8 parts by weight is added to the homogenized substance to mix the same for preparing a starch dough. A seasoning, for instance, table salt sodium glutaminate or the like may be added until an amount of 30 parts by weight to 100 parts by weight of the starch raw material, as occasion demands.

If the leaving period of time, after added the water is too short and thus the permeation of water into the raw material is not sufficient, a blocking phenomenon shall occur due to contact of the calcium salt to be added later with water, whereby the calcium salt does not homogeneously disperse to make difficult to obtain products with a constant quality and decrease productivity. If the leaving period of time is too long, while, the permeation of water into the raw material proceeds but drying of homogenized of wetty mass of the raw materials shall cause from its surface, which makes difficult to obtain product with a constant quality and decreases productivity, similar to the above.

Thereafter, the starch dough prepared as above is charged into the extruder with double-staged die having inner diameter at outlet-side larger than that at inlet-side and circular cross-section to cook the starch dough under conditions of inner pressure of 50–70 kg/cm$^2$ and temperature of 130–145° C. and extrude the cooked starch dough through the die to cause expansion and formation thereof, whereby a desired stick type expanded starch confectionery with a wave-like stereo-configuration on its surface can be obtained.

BEST MODE FOR CARRYING OUT THE INVENTION

An apparatus for manufacturing a stick type expanded starch confectionery according to the invention will now be explained with reference to the drawings and a process for manufacturing the confectionery will be explained by Examples.

Figure 1:
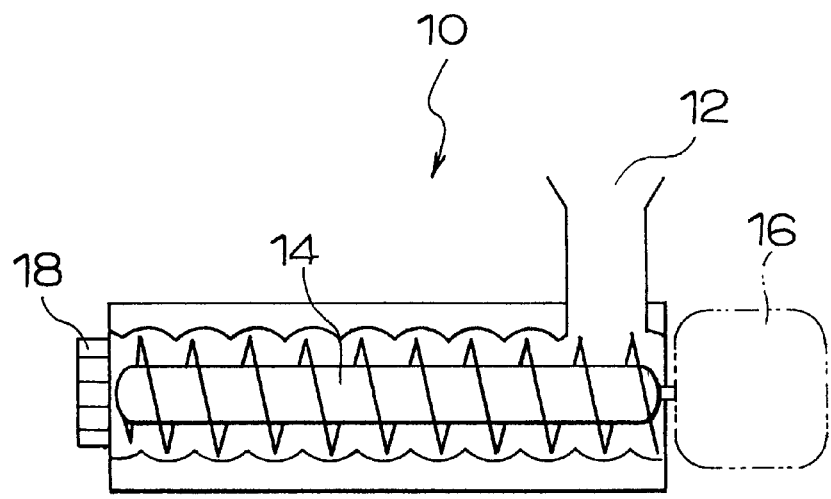
FIG. 1 is a schematic and longitudinal section of an extruder to be used for carrying out a process according to the invention.

In FIG. 1, there is schematically shown a single screw extruder 10 for the manufacture of the stick type expanded starch confectionery according to the invention. The extruder 10 has a hopper 12 for charging raw material for a dough, a screw 14, an electric motor 16 for rotatory driving the screw, and a die 18, from which cooked dough is extruded.

Figure 2:
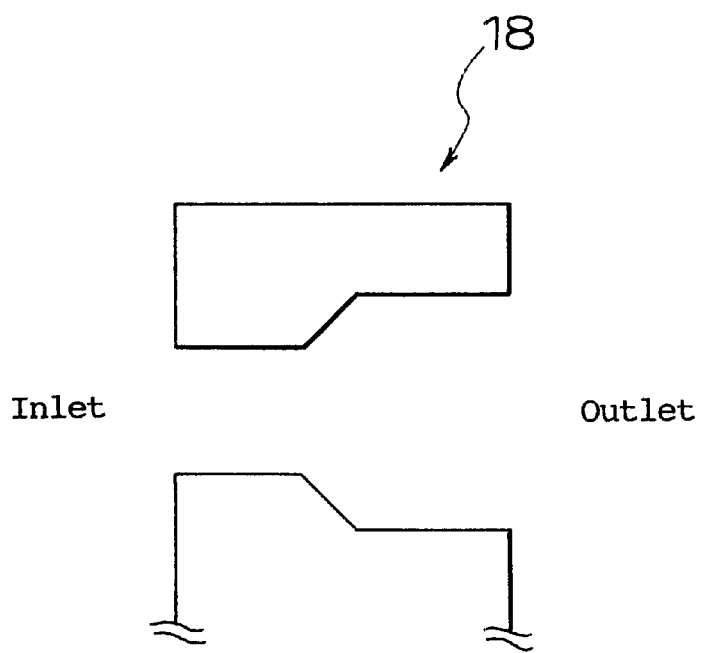
FIG. 2 is a schematic and longitudinal section of a double-staged die having circular cross-section, which is one of parts of the extruder shown in FIG. 1.

As shown in FIG. 2, the die 18 has an inner diameter at outlet-side for the dough larger than that at inlet-side and a gradually enlarging inner diameter in a transitional portion from an ending part at the inlet-side to a beginning part at the outlet-side, toward the outlet-side.

EXAMPLE 1

Figure 4A:
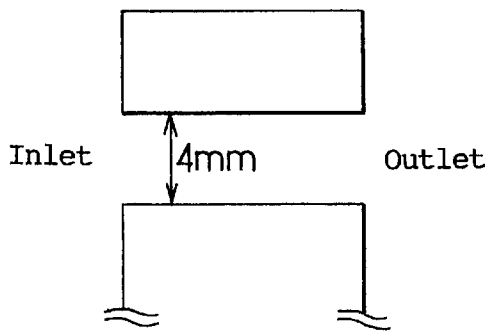
FIGS. 4A, 4B, 4C and 4D are schematic and longitudinal sections of 4 dies employed in Example 3, which are same in inner diameter at inlet-side for a dough, but different in inner diameter at outlet side for the dough.
Figure 4B:
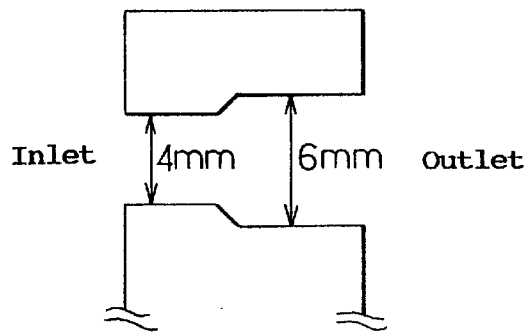
Figure 4C:
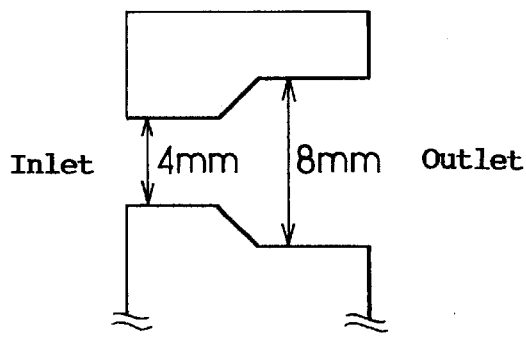
Figure 4D:
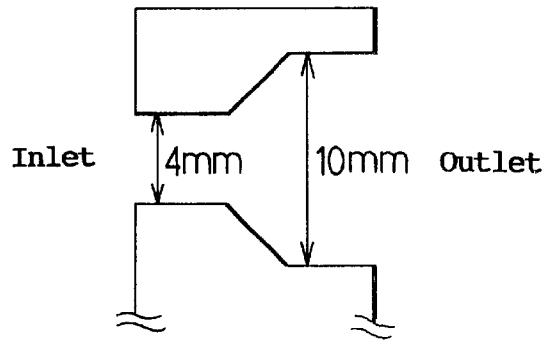

4 kinds of starch doughs different only in an amount of egg shell calcium were prepared by adding water of 10 parts by weight to 100 parts by weight of corn grits V mixing to homogenize the mass, leaving the mass for 30 minutes, as it is, and adding the egg shell calcium in amount of 0, 1.4, 2.0 or 2.8 parts by weight. Each of the doughs was charged into a single screw extruder (manufactured by Aoi Seiki Kabushiki Kaisha, Type MS-25, inner diameter of barrel: 75 mm) was cooked under conditions of inner pressure of 50–60 kg/cm$^2$ and temperature of 140° C. and extruded through a die having an inner diameter of 4 mm at inlet-side, inner diameter of 8 mm at outlet-side for the dough, and a gradually enlarging inner diameter with angle of 45 degrees in a transitional portion from an ending part at inlet-side to a beginning part at outlet-side (this die corresponds to that as shown in FIG. 4C) to obtain 4 kinds of stick type expanded starch confectioneries (Products A, B, C and D).

Figure 3:
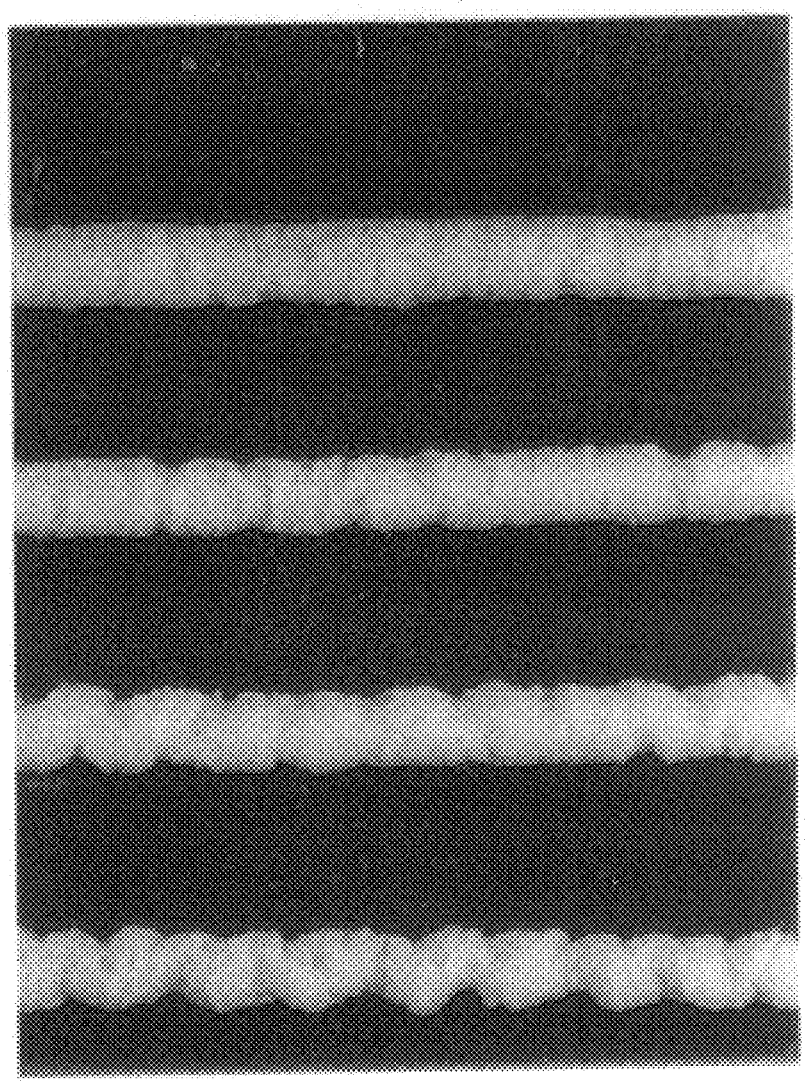
FIG. 3 is a photograph taken 4 expanded starch confectioneries which were obtained in Example 1 by treating with the extruder 4 kinds of raw materials different only in an amount of egg shell calcium, to show differences of configuration on surface thereof.

External appearances of the products are shown in FIGS. 3A–3D. As apparently therefrom, no wave-like configuration can be recognized on surface of the products A (FIG. 3A) obtained by using the dough, in which the egg shell calcium has not been composed, and the wave-like stereoconfiguration on surface has been made clear, as composing amount of the egg shell calcium increases, namely in the order of products B, C and D (FIGS. 3B, 3C and 3D). It is apparent, therefore, the composing of egg shell calcium is one of important factors for providing wave-like configuration on surface of the products.

Similar experiments were carried out by using calcium carbonate and calcium sulfate in lieu of the egg shell calcium to obtain results similar to the above case.

EXAMPLE 2

To 100 parts by weight of corn grits, water of 1–15 parts by weight was added to mix and homogenize the same. After leaving the homogenized mass for 30 minutes, as it is, and then egg shell calcium of 2 parts by weight was added to mix the same to prepare 15 kinds of starch doughs which are different only in an amount of water. Each of the doughs was charged into an extruder as employed in Example 1 to cook the dough under conditions of inner pressure of 60–70 kg/cm$^2$ and temperature of 135–140° C., and extruded the cooked dough through the die for preparing stick type expanded starch confectioneries.

External visual appearances of the confectioneries were judged based on following evaluation standards to obtain results as shown in following Table 1.

1:Do not show stereo wave-like configuration.

2:Shows wave-like configuration, but it is not continuous and thus is not clear.

3:Shows a continuous wave-like configuration, but It is not clear.

4:Shows a continuous and clear wave-like configuration.

TABLE 1

| Amount of water (parts by weight) | State of wave configuration | Remarks |
| --- | --- | --- |
| 1 | 2 | |
| 2 | 2 | |
| 3 | 2 | |
| 4 | 3 | |
| 5 | 3 | |
| 6 | 4 | |
| 7 | 4 | |
| 8 | 4 | |
| 9 | 4 | |
| 10 | 4 | |
| 11 | 3 | |
| 12 | 2 | |
| 13 | 2 | |
| 14 | 2 | |
| 15 | 1 | It is impossible to form a wave-like configuration, since the dough is too soft |

As apparently seen from Table 1, wave-like external configuration shall appear on surface of expanded starch confectionery, when water is added in an amount of more than a certain level and the wave-like configuration shall become clear, as the amount of water increases, but the configuration can not be maintained, if the amount of water is over another certain level. This means that the amount of water to be added forms another important factors for providing wave-like configuration to the stick type expanded starch confectionery.

EXAMPLE 3

A starch dough was prepared by adding water of 10 parts by weight to 100 parts by weight of corn grits, mixing and homogenizing the same, adding 2 parts by weight of egg shell calcium to mix the mass, and leaving the mass for 30 minutes, as it was. The starch dough was charged to a single shaft extruder (manufactured by Aoi Seiki Kabushiki Kaisha, Type MS-25, inner diameter: 75 mm) to cook the dough under conditions of inner pressure of 60 kg/cm$^2$ and temperature of 140° C., and extrude the cooked dough through various dies shown in FIGS. 4A–4D, for preparing stick type expanded starch confectioneries, each of said dies having same inner diameter of 4 mm at inlet-side and inner diameter of 4, 6, 8 or 10 mm at outlet-side, in which each of the dies having inner diameter of 6, 8 and 10 mm has a gradually enlarging inner diameter with an angle of 45 degrees in a transitional portion from an ending part at inlet-side to a beginning part at outlet-side.

External visual appearances of 4 kinds of expanded starch confectioneries were judged based on the evaluation standards as described in Example 2 to obtain results as shown in following Table 2.

TABLE 2

| Die | Inner diameter of outlet-side | State of wave-like configuration |
| --- | --- | --- |
| 4A | 4 | 1 |
| 4B | 6 | 4 |
| 4C | 8 | 4 |
| 4D | 10 | 4 |

As apparently seen from Table 2, wave-like configuration shall not appear when a mere cylindrical single-stage die (4A) having same inner diameter at inlet- and outlet-sides is employed. On the contrary thereto, wave-like configuration clearly appears on surface of expanded confectioneries, when each of the dies (4B–4D) having inner diameter at outlet-side larger than that at inlet-side is selected.

The expanded confectionery obtained by using the die (4C) having the inner diameter at outlet-side in twice to that at inlet-side showed the most clear wave-like configuration on its surface.

EXAMPLE 4

Figure 5A:
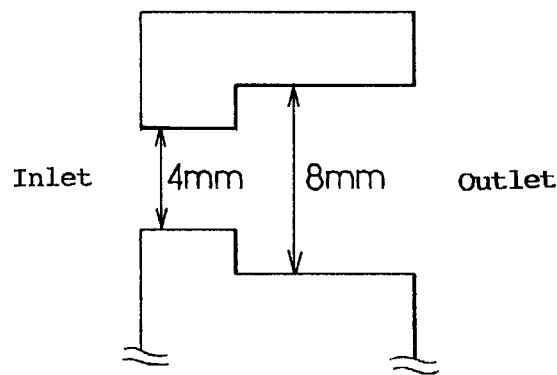
FIGS. 5A, 5B and 5C are schematic and longitudinal sections of 3 dies employed in Example 4, which are same in inner diameters at inlet-side and outlet-side for a dough, but different in transitional portion from an ending part at inlet-side to a beginning part at outlet-side.
Figure 5B:
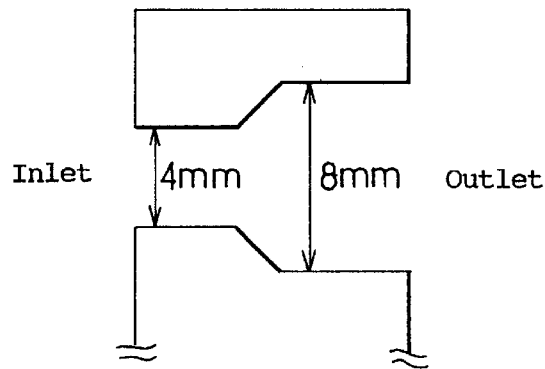
Figure 5C:
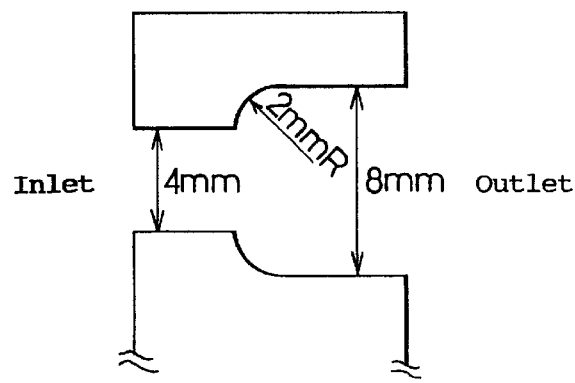

A starch dough was prepared by adding water of 10 parts by weight to 100 parts by weight of corn grits, mixing and homogenizing the same, adding 2 parts by weight of egg shell calcium to mix the mass, and leaving the mass for 30 minutes, as it was. The starch dough was charged to a single screw extruder (manufactured by Aoi Seiki Kabushiki Kaisha, Type MS-25, inner diameter: 75 mm) to cook under conditions of inner pressure of 60 kg/cm$^2$ and temperature of 140° C., and extrude the cooked dough through dies shown in FIGS. 5A–5C, for preparing stick type expanded starch confectioneries, each of said dies having same inner diameters of 4 mm and 8 mm at inlet- and outlet-sides, respectively, each of the dies having an enlarging inner diameter with an angle of 90 or 45 degrees (5A or 5B), or a curved line with one fourth circle (5C), in a transitional portion from an ending part at inlet-side to a beginning part at outlet-side.

External visual appearances of 3 kinds of expanded starch confectioneries were judged based on the evaluation standards as described in Example 2 to obtain results as shown in following Table 3.

TABLE 3

| Die | Inner configuration of die in transitional portion from ending part at inlet-side to beginning part at outlet-side | State of wave-like configuration in surface of products |
| --- | --- | --- |
| 5A | Enlarging with angle of 90 degree | 1 |
| 5B | Enlarging with angle of 45 degree | 4 |
| 5c | Enlarging in curved line with one fourth circle | 4 |

As apparently seen from Table 3, it cannot be said that the surface of confectionery has wave-like configuration, when the die (5A), wherein the ending part at inlet-side is directly connected to the beginning part at outlet-side, is selected. It has been found that the double-staged die (5B or 5C) having the structure of gradually enlarging inner diameter in a transitional portion from the ending part at inlet-side to the beginning part at outlet-side, toward the outlet-side is suitable for obtaining the stick type expanded starch confectionery with wave-like configuration on its surface.

INDUSTRIAL APPLICABILITY

According to the invention, an expanded starch confectionery with a wave-like stereo-configuration on its surface and excellent in liking can be obtained by mere discharging the raw material from an extruder, although it has been considered that preparation of a stick-type expanded starch confectionery with such an intentional stereo-configuration is impossible by an extruder method, other than that a desired forming or working shall be made to the expanded confectionery discharged from the extruder.

What is claimed is:

1. A process for the manufacture of an expanded stick type starch confectionery with wavy outer stereo-configuration, which comprises steps of:

adding water to a starch raw material of cereals or a mixture of the cereals and pulses to mix and homogenize the material, leaving the homogenized mass as it is, for a time of 20 to 60 minutes, adding a calcium salt to and mixing the homogenized material to prepare a dough, feeding the dough into an extruder to thermally treat the dough, and extruding the cooked dough through a double-staged die which has an inner diameter at an outlet-side of 2 to 30 mm, and an inner diameter at an inlet side not exceeding 10 mm, so that the inner diameter at the outlet side is larger than at the inlet-side, a gradually enlarging inner diameter in a transitional portion from an ending part at the inlet-side to a beginning part at the outlet-side in linearly or curved line, toward the outlet-side, and a circular cross-section, whereby in a direction of extrusion, the wavy outer stereo-configuration is formed on a surface of the confectionery.

2. The process for the manufacture of the expanded stick type starch confectionery with wavy outer configuration as claimed in claim 1, wherein at least one of corn grits, wheat flour and rice flour is selected as said cereals and at least one of soy bean flour, green gram flour and red bean flour is selected as said pulses.

3. The process for the manufacture of the expanded stick type starch confectionery with wavy outer configuration as claimed in claim 1, wherein at least one of egg shell calcium, calcium carbonate and calcium sulfate is selected as said calcium salt.

4. The process for the manufacture of the expanded stick type starch confectionery with wavy outer configuration as claimed in claim 1, wherein water is added in an amount of 1–14 parts by weight to 100 parts by weight of said starch raw material.

5. The process for the manufacture of the expanded stick type starch confectionery with wavy outer configuration as claimed in claims 1 or 3, wherein said calcium salt is added in an amount of 0.5–5 parts by weight to 100 parts by weight of said starch raw material.

6. The process for the manufacture of the expanded stick type starch confectionery with wavy outer configuration as claimed in claim 1, wherein the inner diameter of the outlet side of said double stage die is twice the inner diameter at the inlet side.

* * * * *